United States Patent [19]
Ito et al.

[11] Patent Number: 5,734,985
[45] Date of Patent: Mar. 31, 1998

[54] SIMULCAST PHASE SYNCHRONIZATION SYSTEM

[75] Inventors: Shogo Ito, Yokohama; Nobuhiro Nishikawa, Iruma-gun; Mitsuru Murata, Yokohama; Toshihiro Nozawa, Iida, all of Japan

[73] Assignee: NTT Mobile Communications Network Inc., Tokyo, Japan

[21] Appl. No.: 367,263
[22] PCT Filed: Jul. 11, 1994
[86] PCT No.: PCT/JP94/01127
  § 371 Date: Jan. 16, 1996
  § 102(e) Date: Jan. 16, 1996
[87] PCT Pub. No.: WO95/02932
  PCT Pub. Date: Jan. 26, 1995

[30] Foreign Application Priority Data

Jul. 12, 1993 [JP] Japan .................. 5-171833

[51] Int. Cl.⁶ ........................................ H04B 7/00
[52] U.S. Cl. .............................. 455/503; 455/13.2
[58] Field of Search ...................... 455/51.1, 51.2, 455/57.1, 186.1, 56.1, 63, 65, 12.1, 13.2, 502, 503; 331/47; 368/47; 340/825.44

[56] References Cited

U.S. PATENT DOCUMENTS

| | | | |
|---|---|---|---|
| 4,607,257 | 8/1986 | Noguchi | 455/12.1 |
| 4,899,117 | 2/1990 | Vig | 331/47 |
| 5,257,404 | 10/1993 | Goreham et al. | 455/51.2 |
| 5,261,118 | 11/1993 | Vanderspool, II et al. | 455/51.2 |
| 5,335,357 | 8/1994 | Fennell et al. | 455/51.2 |
| 5,416,808 | 5/1995 | Witsaman et al. | 455/51.2 |
| 5,423,058 | 6/1995 | Cudak et al. | 455/51.2 |
| 5,521,887 | 5/1996 | Loomis | 368/47 |
| 5,561,701 | 10/1996 | Ichikawa | 455/51.2 |

FOREIGN PATENT DOCUMENTS

| | | |
|---|---|---|
| 61-62244 | 3/1986 | Japan . |
| 2-67820 | 3/1990 | Japan . |
| 215135 | 6/1990 | Japan . |
| 3-61893 | 3/1991 | Japan . |

*Primary Examiner*—Reinhard J. Eisenzopf
*Assistant Examiner*—Lester G. Kincaid
*Attorney, Agent, or Firm*—Cushman, Darby & Cushman IP Group of Pillsbury, Madison & Sutro LLP

[57] ABSTRACT

In order for simulcast phase synchronization to be carried out autonomously by each base station, a highly accurate clock is provided in the central station and in each base station, and phase compensation is performed in accordance with time information from these clocks. As a result, simulcast synchronization that depends on the accuracy of clocks can be established, and the required synchronization accuracy can be obtained even when high transmission speeds are involved. The clocks can be corrected by a portable reference clock brought to each base station and central station site, and/or by a global positioning system installed at each base station and/or central station site. Because this invention is constituted so that each frame of paging signals transmitted by a base station is transmitted under the control of a reference clock in accordance with a preset table, it becomes unnecessary to indicate transmission times in the paging signals that are sent from the central station to the base stations, whereby base station equipment is simplified.

5 Claims, 9 Drawing Sheets

Fig.5 (a) input (paging) signals

Fig.5 (b) input clock

Fig.5 (c) output (paging) signals

Prior Art

SIMULCAST PHASE SYNCHRONIZATION SYSTEM

TECHNICAL FIELD

This invention relates to mobile communications, and in particular to cases where there are a plurality of base stations which provide radio communication channels to mobile stations, and where these plurality of base stations transmit identical paging signals simultaneously and at the same frequencies. This invention specifically relates to phase synchronization technology for the signals transmitted by this plurality of base stations.

BACKGROUND TECHNOLOGY

Figure 10:
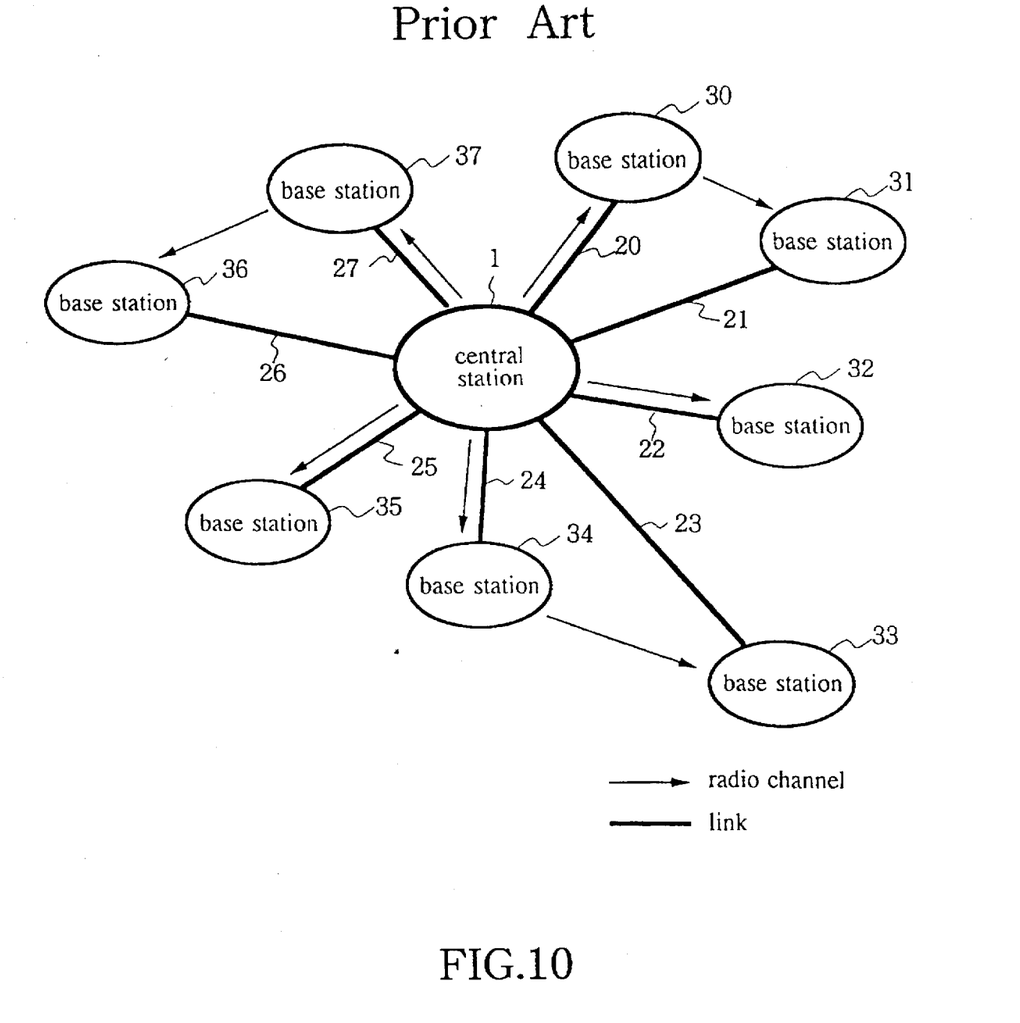
FIG. 10 . . . block diagram of prior art.

A prior art example will be explained with reference to FIG. 10, which is a block diagram serving to explain phase synchronization according to the prior art example. The explanation given here will deal with the case of a radio paging system in which the mobile stations comprise receivers and do not have transmitting devices. In a radio paging system, paging signals are transmitted from a plurality of base stations 30–37 at the same frequencies, and it is therefore necessary for the transmission timing of the radio signals at each base station 30–37 to be synchronized. The paging signals are transmitted to base stations 30–37 from central station 1 by means of links 20–27 (as a rule, these are wire circuits). By adding a fixed delay to the aforementioned paging signals at base stations 30–37, they will be transmitted as radio waves at the same frequencies in such manner that the transmission timing at base stations 30–37 becomes synchronized.

A widely used method to synchronize base stations 30–37 is to have base stations 30–37 receive (i) the paging signals transmitted via links 20–27 and (ii) paging signals from a reference base station, these latter paging signals being transmitted as radio waves. The respective reception timings of these paging signals are extracted and any time differences corrected by means of delay circuits, thereby keeping the radio signal transmission timing of any given base station in step with the radio signal transmission timing of the reference base station.

However, in a conventional phase synchronization system of this sort, because reception timing measurement errors in respect of links 20–27 and reception timing measurement errors in respect of radio waves received through the air accumulate, synchronization accuracy deteriorates, and, especially when transmission speed is high, the synchronization timing may no longer come within the required range.

In Japanese Unexamined Patent No. 61-62244 there is disclosed a system wherein a time signal generator, i.e., a reference clock, is provided in central station 1 and in each base station 30–37. This system is constituted so that the phase of the radio signals transmitted from central station 1 and base stations 30–37 is transmitted in accordance with time information generated by these references clocks. In addition, time correction of these reference clocks is performed in accordance with correction information transmitted from central station 1. In this case, however, because the delay time of the correction information will differ according to the length of the link between central station 1 and a given base station 30–37, time correction cannot be carried out with more than a certain limiting accuracy. One solution considered as regards this problem is to compensate for delay time differences in accordance with distance information for each link. This would be possible if the communication links connecting base stations 30–37 with central station 1 were invariably fixed-length links. However, in many cases the routes of the communication links connecting central station 1 and base stations 30–37 will vary in accordance with traffic conditions at any given time, and under such circumstances accurate correction of the reference clocks will be impossible.

Figure 11:
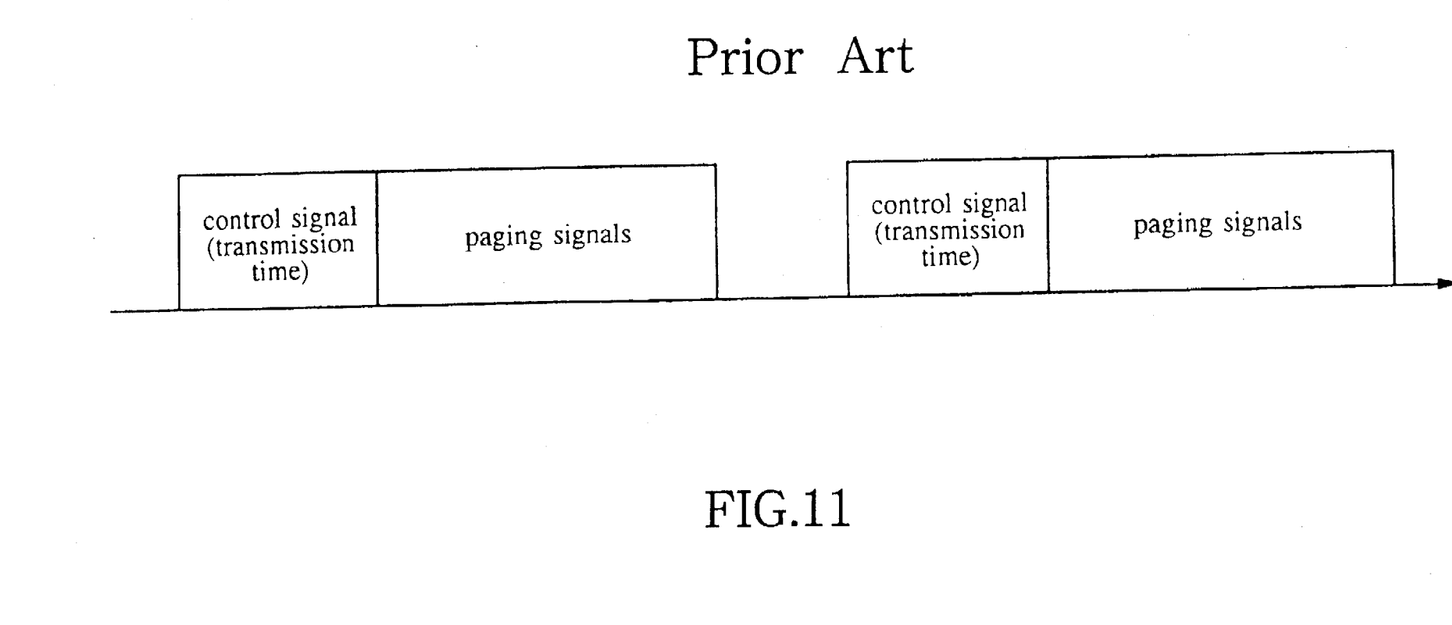
FIG. 11 . . . block diagram of signals transmitted to the links in the prior art.

Even if the reference clock provided at each base station in a system of the sort described above could be accurately corrected so that transmission could be carried out in synchronization with the reference clocks, the following sorts of problems would remain. Namely, the paging signals transmitted from central station 1 to base stations 30–37 have to be assigned timings for transmission from base stations 30–37. To do this, it is necessary to add to each series of paging signals a control signal which indicates the time at which transmission should take place (see FIG. 11). This transmission time is information which might, for example, state that the following paging signals will be transmitted starting at __ hours __ minutes __ seconds. Now, these control signals and paging signals may be transmitted at 64 kb/s, for example. On the other hand, the transmission speed of the radio signals transmitted from base stations 30–37 is 1.2 kb/s, and therefore the signals in the links will be intermittent signals as shown in FIG. 11. Moreover, because these control signals are not transmitted from base stations 30–37 as radio signals, it becomes necessary to have circuits at each base station 30–37 which will remove the signal portions corresponding to these control signals. In other words, a prior art system of this sort has the shortcomings that the equipment pertaining to base stations 30–37 is complicated and the throughput of the links is reduced.

The present invention has been devised against this background. It is an object of this invention to provide a phase synchronization system which can (i) establish simulcast synchronization that depends on the accuracy of a clock, and (ii) obtain the required synchronization accuracy even when high transmission speeds are involved.

It is another object of this invention to provide a system which can make extremely accurate corrections to the reference clocks of the base stations and the central station, and which can substantially eliminate phase deviation of the frame signals transmitted by the various stations.

It is another object of this invention to provide a system which can use an extremely economical and practical means to substantially eliminate phase deviation of the frame signals transmitted by the various stations.

It is another object of this invention to provide a system wherein it is unnecessary to add transmission timing information to paging signals transmitted from the central station to the base stations, whereby base station equipment can be simplified and the throughput of the links can be improved.

It is another object of this invention to provide a method for correcting the highly accurate clocks for phase synchronization which are installed in the central station and in each base station.

DISCLOSURE OF THE INVENTION

According to a first aspect, this invention is a simulcast phase synchronization system, and its distinguishing feature is that each base station has an extremely accurate reference clock which counts the same time.

That is to say, this invention is characterized in that it has a plurality of base stations which are connected to mobile stations by means of radio channels, plus a central station which controls these plurality of base stations; and in that the aforementioned central station has a means which transmits, to the aforementioned base stations, the frame synchronization signals which the base stations have to transmit to the mobile stations; and in that the aforementioned central station and base stations each have (i) a reference clock which counts the same time, (ii) a means which adjusts the transmission timing of the aforementioned frame synchronization signals on the basis of time information from this reference clock, and (iii) a means which corrects this reference clock.

It is desirable for the aforementioned means which corrects the reference clock to comprise a means which corrects the time of the reference clock in a given station by receiving radio signals which arrive from satellites in one and the same global positioning system (GPS).

It is desirable for the aforementioned satellites in one and the same system to be the same satellite.

The aforementioned reference clocks are clocks which have a rubidium oscillator or a cesium oscillator. The aforementioned correcting means can comprise (i) a moveable reference clock which is provided in addition to the aforementioned reference clocks that are respectively provided at the central station and the base stations, and (ii) a means which corrects the times of these latter clocks by electrically connecting this moveable reference clock to the aforementioned respectively provided reference clocks over a distance which is sufficiently short to avoid delay time becoming a problem.

The aforementioned means which adjusts the transmission timing of the frame synchronization signals may comprise (i) a means which temporarily stores the signal frames to be transmitted, (ii) a table which gives the aforementioned time information corresponding to the number of the signal frame to be transmitted, and (iii) a means which, on the basis of this table, selects from the aforementioned temporary storage means a signal frame to be transmitted in synchronization with the aforementioned time information.

The aforementioned temporary storage means may comprise a means which stores the signals that have been sent from the aforementioned central station after dividing them into transmitted signal frames.

According to a second aspect, this invention is a reference clock correction method, and is characterized in that, in a method for correcting highly accurate reference clocks that have been respectively provided in a plurality of base stations connected to mobile stations by means of radio channels, and in a central station which controls these plurality of base stations, there is provided a moveable reference clock in addition to the aforementioned reference clocks, and this moveable reference clock is physically moved to each of the aforementioned base stations and to the aforementioned central station, and placed beside the reference clock at these base stations and at the central station, and the reference clocks at the aforementioned base stations and at the aforementioned central station are synchronized with this moveable reference clock.

Each base station can obtain identical current time information by means of the highly accurate clock which counts the same time and is provided at each base station. By comparing this time information with the information relating to the corresponding frame to be transmitted, each base station can independently perform phase compensation control.

This makes it possible to establish simulcast synchronization which depends on the accuracy of a clock. It also enables satisfactory synchronization accuracy to be obtained even when high transmission speeds are involved.

An arrangement may also be provided whereby a global positioning system (GPS) is used to enable each base station to independently correct a reference clock. The receiving devices used with a GPS are mass-produced and therefore inexpensive. Because each GPS satellite has a reference clock, the aforementioned correction can be carried out extremely accurately. It follows that the central station and the base stations can correct their reference clocks extremely accurately in accordance with time information from a GPS. This correction may be performed from time to time as required by the accuracy of these reference clocks, or it may be performed at regular intervals.

By (i) providing a moveable reference clock in addition to the aforementioned reference clocks, (ii) physically moving this moveable reference clock to each of the aforementioned base stations and to the aforementioned central station, (iii) placing it beside the reference clock of each base station and of the central station, and (iv) synchronizing the aforementioned base station and central station reference clocks to this moveable reference clock, the time can be set by centralizing in the central station a highly accurate clock which uses a rubidium oscillator or a cesium oscillator, thereby saving the trouble of distributing these clocks to each base station.

OPTIMUM CONFIGURATIONS FOR IMPLEMENTING THIS INVENTION

Figure 1:
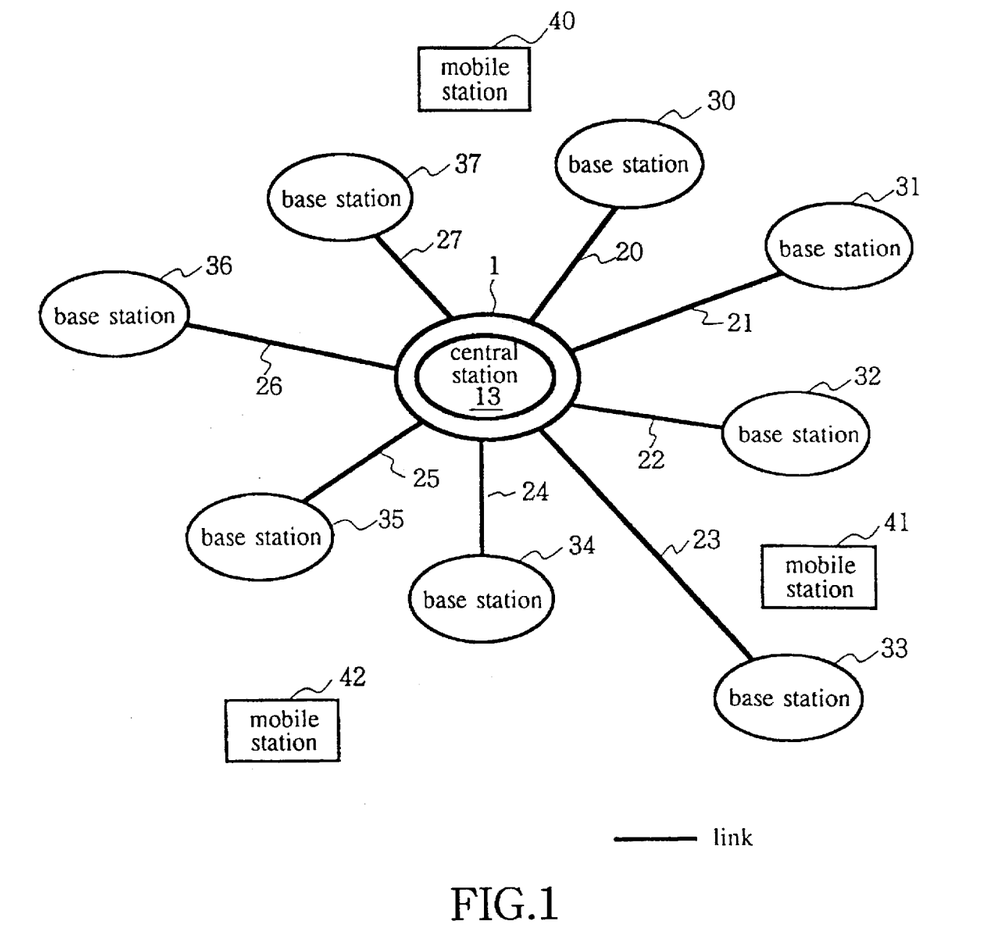
FIG. 1 . . . block diagram of a first embodiment of this invention.
Figure 2:
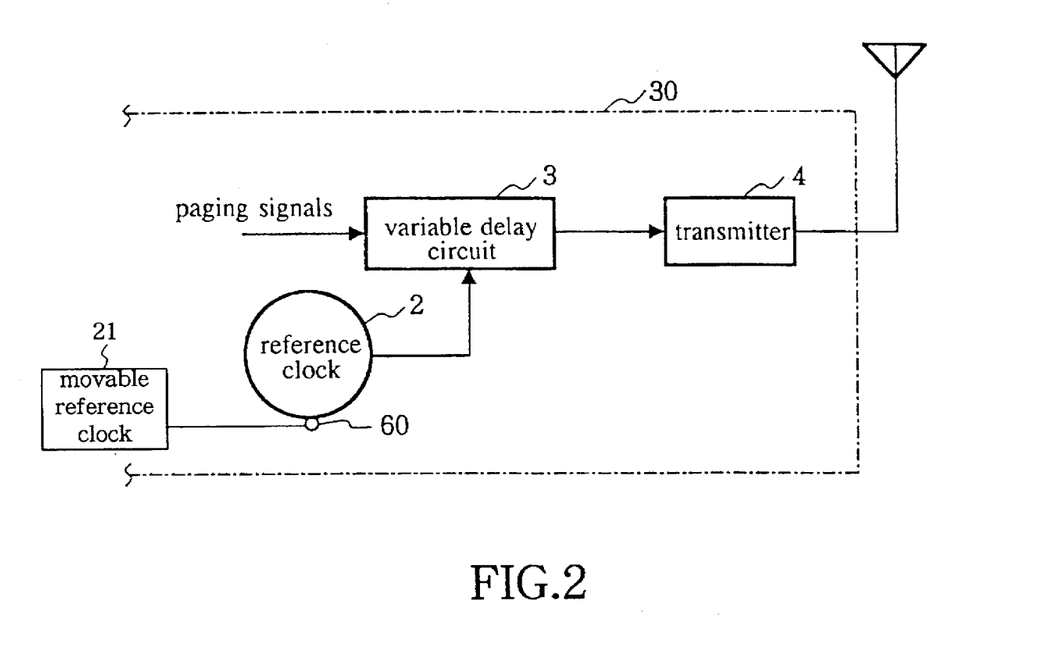
FIG. 2 . . . block diagram showing the main parts of a central station and a base station in the first embodiment.

The constitution of a first embodiment of this invention will be explained with reference to FIG. 1 and FIG. 2. FIG. 1 is a block diagram of an arrangement according to this first embodiment, and FIG. 2 is a block diagram of the main parts of the central station and the base stations.

This invention is a simulcast phase synchronization system which has the following distinguishing features. It has base stations 30-37 which are connected to mobile stations 40-42 by means of radio channels, plus central station 1 which controls these base stations 30-37. Central station 1 has frame synchronization signal transmitting part 13 which serves as a means for transmitting to base stations 30-37, by way of links 20–27, the frame synchronization signals which base stations 30–37 have to transmit to mobile stations 40–42. As shown in FIG. 2, each base station 30–37 has reference clock 2 which counts the same time, variable delay circuit 3 which serves as a means for adjusting the transmission timing of the aforementioned frame synchronization signals on the basis of time information from this reference clock 2, and correction terminal 60 which serves as a means for correcting reference clock 2.

Explanations will now be given regarding highly accurate reference clock 2 which is used in the first embodiment of this invention, and regarding synchronizing the times of these reference clocks 2. A highly accurate reference clock which employs either a rubidium oscillator or a cesium oscillator is used as reference clock 2. To synchronize the times at base stations 30–37, reference clocks 2 for installation at base stations 30–37 are firstly synchronized in the same place and then distributed among base stations 30–37. To perform this synchronization, the time pulses transmitted by two reference clocks are applied to a single comparison circuit and compared, any difference between them is measured, and the clocks are advanced or put back by a value corresponding to this difference.

In this first embodiment of the invention, paging signals which arrive at a base station from a link are temporarily stored in variable delay circuit 3. This variable delay circuit 3 is read on the basis of signals from reference clock 2, whereupon the paging signals are transmitted from transmitter 4 as a radio signal.

Each base station 30–37 has the same constitution as that shown in FIG. 2. In order to maintain simultaneity of the clocks in base stations 30–37, one reference clock for moving (not illustrated) is provided in addition to the reference clocks that are provided fixedly in central station 1 and base stations 30–37. This reference clock for moving is corrected by means of reference clock 2 of central station 1 and is transported to each of base stations 30–37. The reference clocks 2 of base stations 30–37 are then respectively corrected by connecting this reference clock for moving to correction terminal 60. In this first embodiment of the invention, reference clocks employing rubidium oscillators were used as the reference clocks. A reference clock 2 employing a rubidium oscillator has a long-term frequency stability of better than $2\times10^{-11}$/month, and if it is assumed that the reference clock pulses produced by this reference clock 2 at 1 second intervals are based on oscillations of this rubidium oscillator, then the maximum value of the time error per month will be:

$$60 \text{ (seconds)} \times 60 \text{ (minutes)} \times 24 \text{ (hours)} \times 30 \text{ (days)} \times 2\times10^{-11} \times \text{½} = 25.92 \text{ (µs)}.$$

Accordingly, by synchronizing reference clocks 2 of base stations 30–37 approximately once a month, it is possible to achieve simulcast synchronization with a signal transmission time difference between central station 1 and base stations 30–37 (i.e., a simulcast synchronization accuracy) of less than 26 µs. If the synchronization of reference clocks 2 in base stations 30–37 is carried out approximately once a week, simulcast synchronization with a simulcast synchronization accuracy of better than 7 µs will be possible. Although the explanation given here has concerned the case where the time reference is central station 1 or a specific radio station, it is also possible to carry out subordinate synchronization between neighbouring base stations 30–37.

Figure 3:
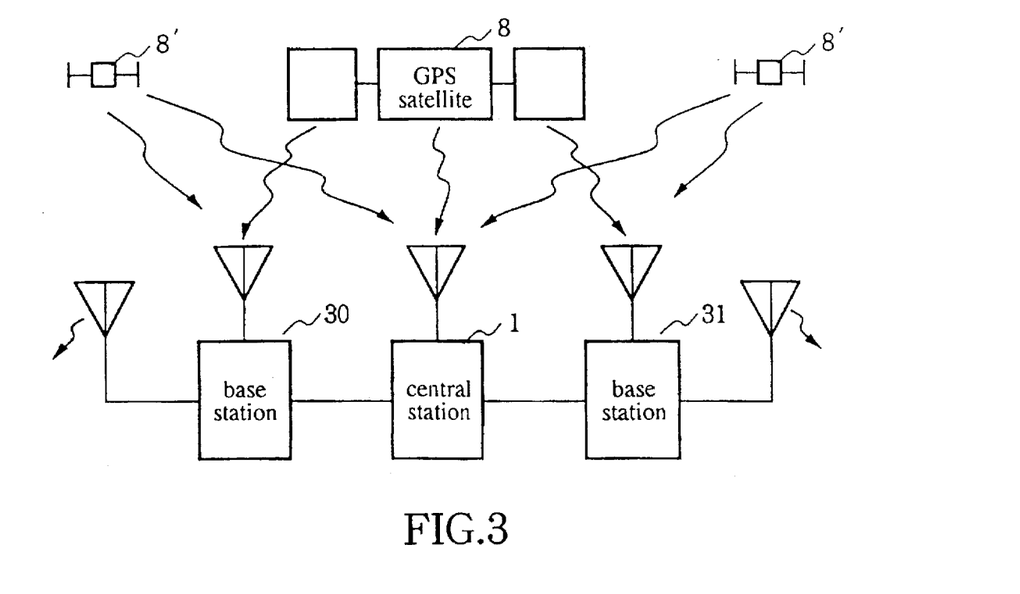
FIG. 3 . . . block diagram of a second embodiment of this invention.
Figure 4:
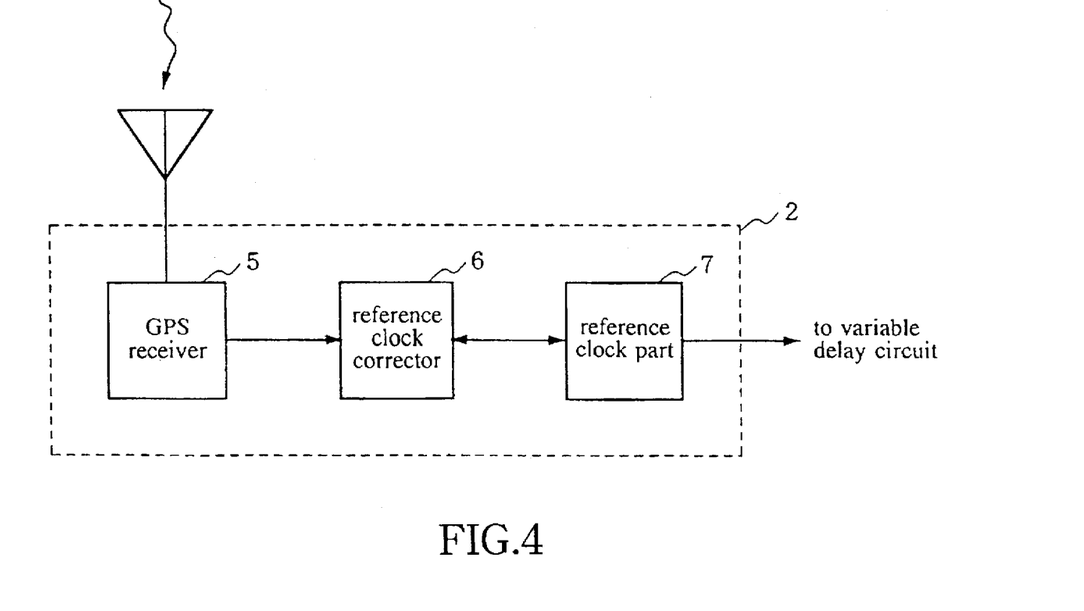
FIG. 4 . . . block diagram of a reference clock in this second embodiment.

A second embodiment of this invention will now be explained with reference to FIG. 3 and FIG. 4. FIG. 3 is a block diagram of this second embodiment, while FIG. 4 is a block diagram of the reference clocks in this second embodiment. The explanation given in connection with the first embodiment concerned the case where the clocks installed in base stations 30–37 are corrected separately from reference clock 2 of central station 1. However, in this second embodiment of the invention, a GPS radio wave is received at each base station 30–37 and synchronization of the clocks is carried out by means of this radio wave.

As shown in FIG. 3, artificial satellites 8 and 8' of the GPS are members of a group of 24 artificial satellites which circle the earth, and each of these satellites is equipped with an extremely accurate atomic clock. This GPS is generally used for measurement of position. To measure position, time signals transmitted simultaneously from three or four satellites are received, whereupon the position of a given receiver can be computed from the arrival time differences of these signals. This can be utilized for time correction, which is carried out as follows. First of all, the GPS is used to measure the position of a given station. This is the primary purpose of the GPS, and the position will be measured with adequate accuracy. Next, the highly accurate, atomic clock based time information which is transmitted from artificial satellite 8 or 8' is received, whereupon each base station 30–37 corrects its own reference clock 2. Although there will be time errors which are dependent on the distance between artificial satellite 8 or 8' and a given base station 30–37, the distance between a given station and the relevant satellite can be accurately obtained from the position of the station in question, which has been measured in the manner described above, by computation using established mathematical formulas. In practice, this is performed automatically by means of a computer. Each base station 30–37 can thus accurately correct its reference clocks 2 by means of time information from the GPS. The accuracy of this correction is greater than 0.1 µs, which is sufficient for simulcast phase synchronization.

The specific constitution of reference clock 2 in this second embodiment of the invention is shown in FIG. 4. As shown in FIG. 4, GPS receiver 5 receives radio waves from artificial satellite 8. Reference clock corrector 6 corrects the time of reference clock part 7 in accordance with time information contained in these radio waves. Reference clock corrector 6 contains circuits for correcting time errors by computing the distance between the station concerned and artificial satellite 8 or 8'.

By using the GPS to carry out time correction at frequent intervals, the reference clock parts 7 that are provided in each base station do not have to be sophisticated ones equipped with rubidium oscillators.

Figure 5:
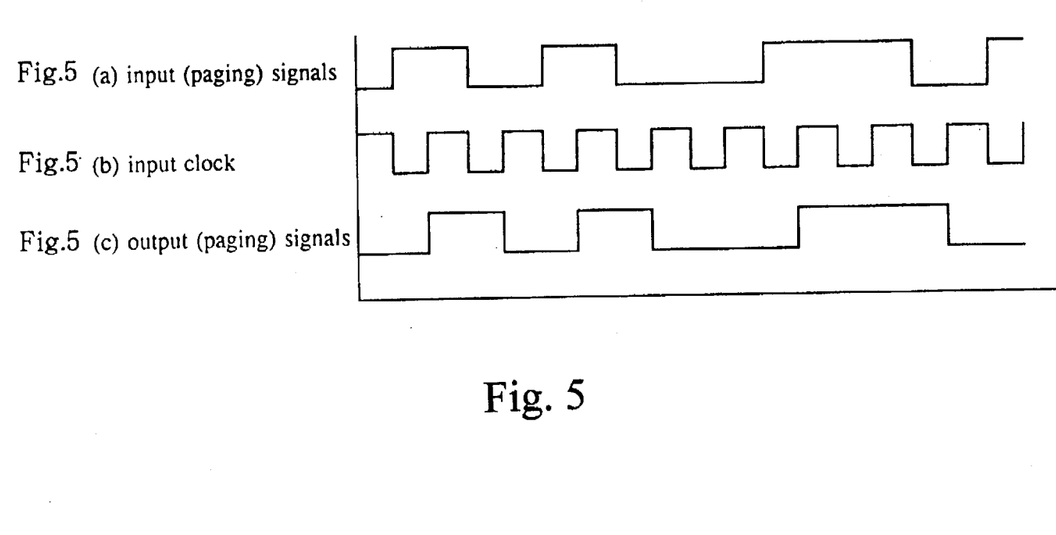
FIG. 5 . . . waveform diagram showing the operation of a retiming circuit.

The operation of base stations 30–37 in the first and second embodiments of this invention will now be explained with reference to FIG. 5, which is a waveform diagram showing the operation of a retiming circuit. As shown in FIG. 2, variable delay circuit 3 is constituted as a retiming circuit. A retiming circuit is a circuit which uses an input clock to recover and output the timing of the input signal, shown in FIG. 5(a). It can be implemented utilizing flip-flop circuits. Retiming is carried out by means of the timing of the rising edge of the input clock shown in FIG. 5(b). A retiming circuit of this sort facilitates transmission timing control to within a single bit.

Figure 6:
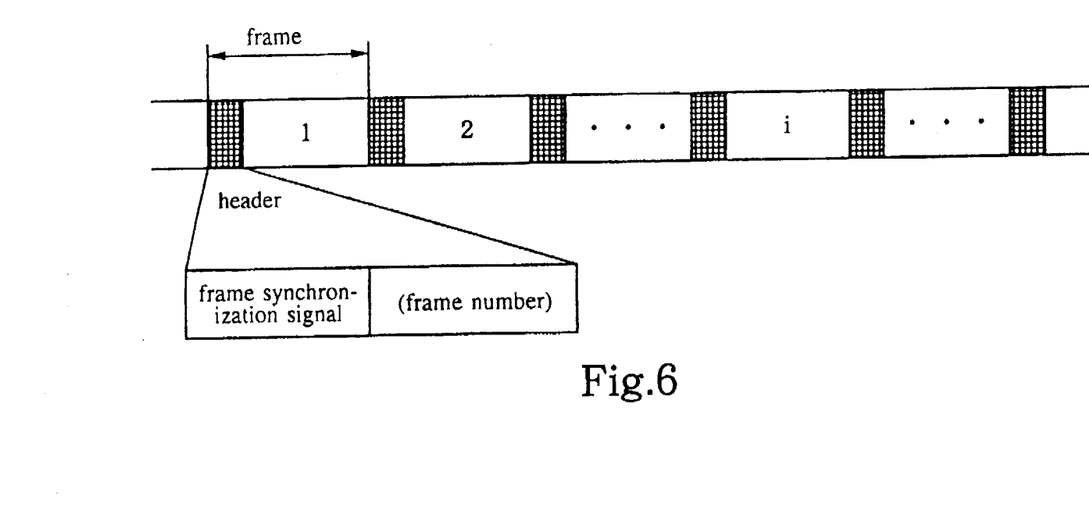
FIG. 6 . . . diagram showing paging signal format with division into frames.
Figure 7:
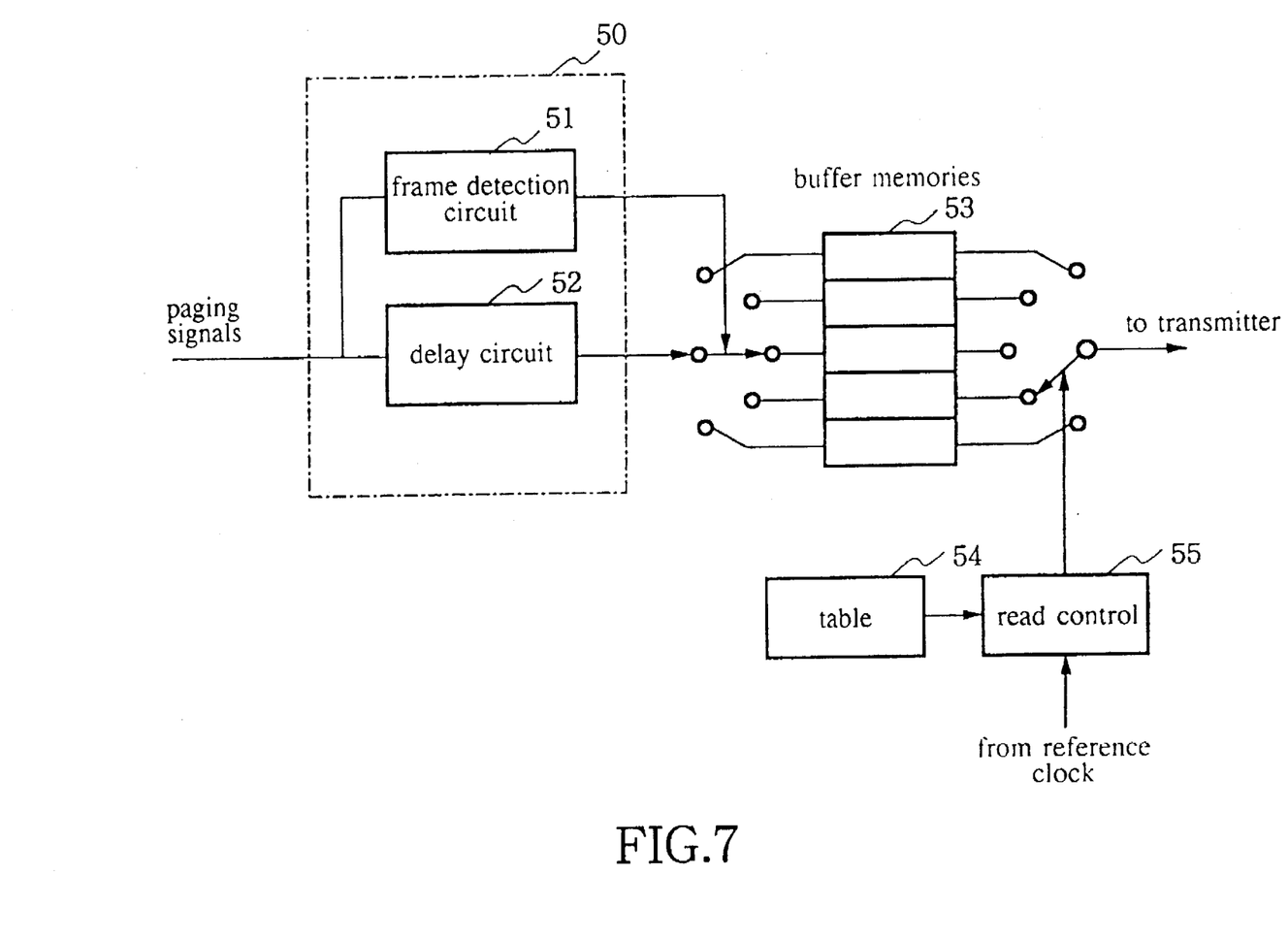
FIG. 7 . . . block diagram of a variable delay circuit in a third embodiment of this invention.
Figure 8:
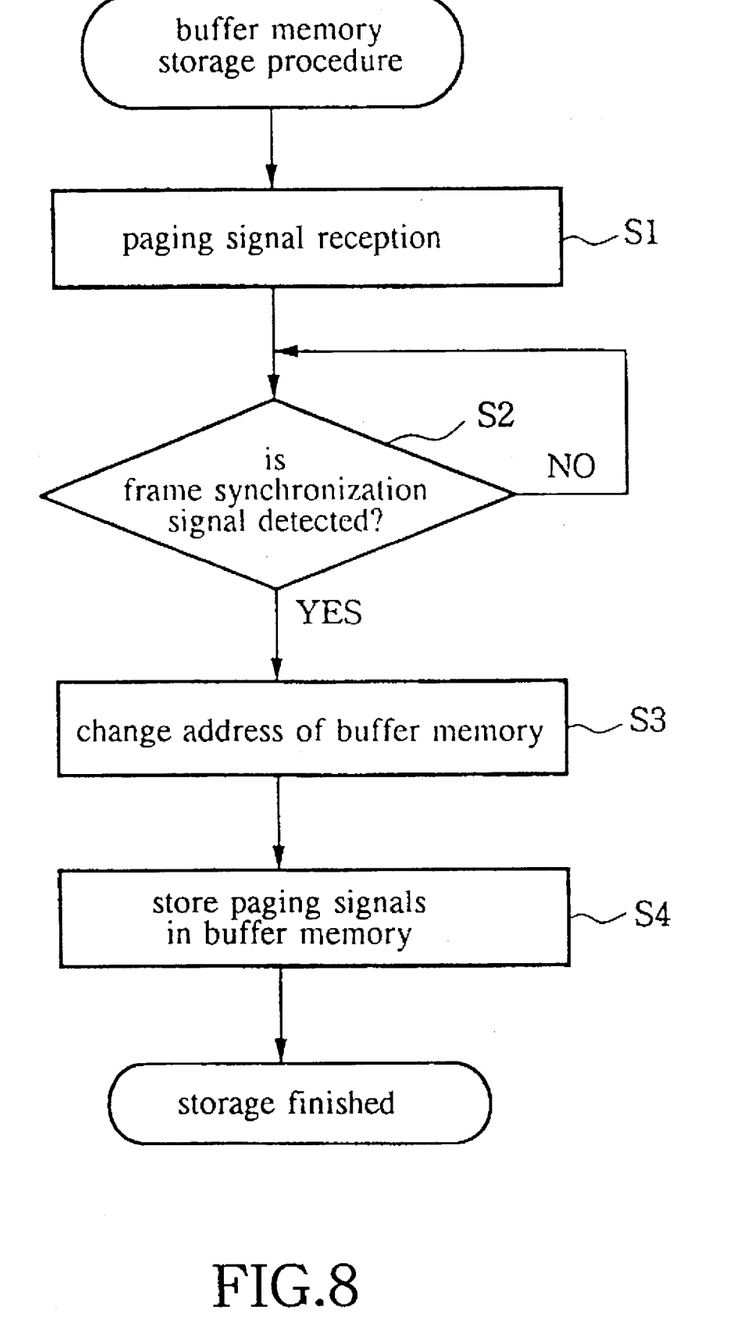
FIG. 8 . . . flow chart showing the buffer memory storage procedure of the variable delay circuit in the third embodiment.
Figure 9:
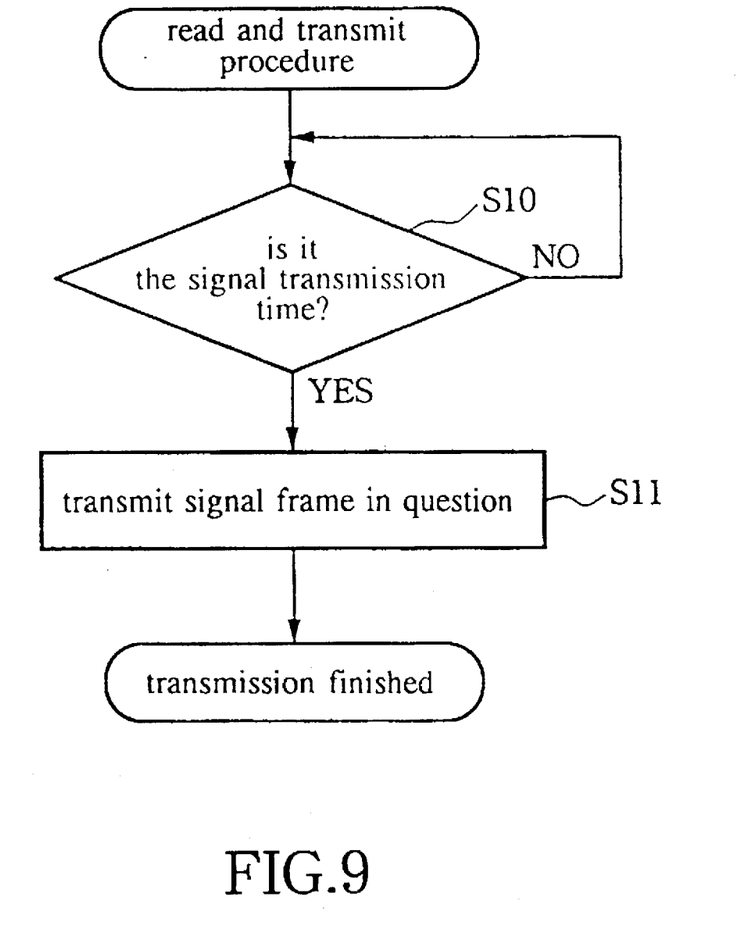
FIG. 9 . . . flow chart showing the read and transmit procedure of the variable delay circuit in the third embodiment.

A third embodiment of this invention will now be explained with reference to FIGS. 6–9. FIG. 6 shows a paging signal format with division into frames. FIG. 7 is a block diagram of variable delay circuit 3 in this third embodiment of the invention. FIG. 8 is a flowchart showing the storage procedure for buffer memories 53 of variable delay circuit 3 of this third embodiment. FIG. 9 is a flowchart showing the read procedure of variable delay circuit 3 of this third embodiment. This third embodiment of the invention is applied when a wide transmission timing control range is selected.

The explanation will proceed with reference to the constitution of base station 30 shown in FIG. 7. In base station 30, paging signals arriving from central station 1 via a link are temporarily stored in delay circuit 52, and frames are detected from these paging signals by means of frame detection circuit 51. The read output of delay circuit 52 for each frame is stored in a buffer memory 53. Meanwhile, as regards the signals to be transmitted from this base station, a table of the sort shown in Table 1 is provided in memory circuit 54, and read control circuit 55 controls the readout of the frame signals stored in these buffer memories 53 in accordance with signals from the reference clock, and sends the contents successively to the transmitter.

As shown in FIG. 8, paging signals are received at base station 30 (S1), and each time a signal frame header (i.e., a frame synchronization signal) of the sort shown in FIG. 6 is detected (S2), the address in buffer memories 53 is changed (S3) and a frame of paging signals is stored in a buffer memory 53 (S4).

As shown in FIG. 9 information that has been written to buffer memories 53 is transferred to the transmitter and transmitted as a radio wave (S11) when the signal transmission time of this frame arrives (S10).

The read timing control in buffer memories 53 can be implemented by presetting the transmission timing of each frame (i.e., the transmission time) in the form of a table in base station 30. Table 1 shows an example of the correspondence between base station transmission times and transmitted frames for the case where frame number information has been added to the signal header. It is assumed here that the frame period is T. In other words, Table 1 shows the correspondence between signal transmission time and frame number.

TABLE 1

| signal transmission time | frame number |
|---|---|
| t0 | 1 |
| T + t0 | 2 |
| 2T + t0 | 3 |
| 3T + t0 | 4 |
| . | . |
| . | . |
| . | . |
| (i − 2) T + t0 | i −1 |
| (i − 1) T + t0 | i |
| . | . |
| . | . |
| . | . |

In Table 1, it is assumed that the signal transmission time of frame number "1" is t0. It will be seen from Table 1 that the i*th* frame should be transmitted at time (i−1)T+t0.

An easy-to-understand example will now be explained. Let it be supposed that time t0 is set every minute to 0 seconds by the reference time. If it is also assumed that one frame is transmitted every second, the number of frames n will be 60. The number of buffer memories 53 in FIG. 7 will then be 60. In other words, paging signals received from the central station via a link are divided into frame signals of 1 second each, which is the state in which they will be transmitted as radio signals, and distributed among buffer memories 53. The paging signals are then read frame by frame, one frame every second, starting from time t0: for example, starting at 2:03:00.00, and transmitted.

The foregoing explanation concerned the case where frame period T is fixed, but even when there are n types of frame period T, namely: $T_1, T_2, T_3, \ldots, T_n$, by similarly setting the frame numbers and signal transmission times in this sort of table, simulcast synchronized communication can be carried out starting at reference time t0. Thus, if the frames become complex, t0 can also be set every 4 minutes on the hour, to 0 minutes 00 seconds, 4 minutes 00 seconds, 8 minutes 00 seconds, and so on.

Although buffer memories 53 and timing controller 50 have here been explained as separately constituted hardware, they can also be constituted as one item of hardware which is then dealt with by means of software.

By thus presetting a table at each base station and reading the contents of the buffer memories in accordance with these tables, it becomes unnecessary to add transmission times to paging signals that are transmitted from the central station to the links, and addressed to the base stations. Consequently, the constitution of the base stations can be simplified and the synchronization of the frame signals transmitted from the base stations can be accurately maintained.

By thus providing buffer memories 53 in each base station, it is possible to cope with a situation in which there have been rapid fluctuations in the delays of the links from the central station to the base stations. Rapid fluctuations in these delays occur when link routes are switched over. In such cases, these fluctuations can be absorbed within the limits of the amount of information stored in buffer memories 53 at that time.

The foregoing explanations have presupposed that frame number information has been added to the signal headers, but we will now consider cases where frame number information is not added to each frame. For example, by ensuring that the nature of the paging signal information of a frame transmitted at a certain time is determined in advance, and by providing a means at the receiving side which detects this frame, frame numbers become unnecessary. Alternatively, by ensuring that the number of a frame transmitted at a certain time is determined in advance, and by adding a frame number to this frame only, frame number information becomes unnecessary for subsequent frames. In this case, the allowable synchronization error of the simulcast synchronization becomes ±T/2.

The descriptions given in the three embodiments of this invention have concerned radio paging systems, but this invention is not restricted to radio paging systems and can be similarly applied in respect of radio communication systems which require simulcast synchronization.

As has now been explained, this invention can provide a phase synchronization system which can (i) establish simulcast synchronization that depends on the accuracy of a clock, and (ii) obtain the required synchronization accuracy even when high transmission speeds are involved.

Furthermore, although the explanations given in the first and third embodiments of this invention presupposed the use of highly accurate clocks such as rubidium oscillators or cesium oscillators, if it is assumed that the reference clocks are corrected at frequent intervals using GPS, as described in the second embodiment, it will not be essential to use clocks which maintain high accuracy over long periods of time. This allows an inexpensive base station device to be constructed.

We claim:

1. A simulcast phase synchronization system comprising:
a plurality of base stations connected to mobile stations by means of radio channels;

a central station which controls the plurality of base stations, said central station comprising:

means which transmits, to the plurality of base stations, frame synchronization signals for the mobile stations;

the central station and the plurality of base stations each comprising:

(i) a reference clock which counts the same time, (ii) means which adjusts, on a basis of time information from the reference clock, transmission timing of paging signals which contain the frame synchronization signals, wherein the means which adjusts comprises:

(a) means which temporarily stores signals to be transmitted after dividing the signals to be transmitted into frames;

(b) a table which provides the time information that corresponds to a number of frames; and (c) means which, on a basis of the table, selects frames from the temporary storage means in synchronization with the time information, and (iii) means which corrects the reference clock;

wherein the transmission timing of each frame of said paging signals is preset in the table in each of said base stations.

2. The simulcast phase synchronization system as set forth in claim 1, wherein the means which corrects the reference clock comprises:

means which corrects the time of the reference clock of a given one of the plurality of base stations by receiving radio signals arriving from at least one satellite in one and the same Global Positioning System.

3. The simulcast phase synchronization system as set forth in claim 2, wherein:

the radio signals arrive from the same satellite.

4. The simulcast phase synchronization system as set forth in claim 1, wherein:

the reference clock comprises one of a rubidium oscillator and a cesium oscillator; and the means which corrects the reference clock further comprises:

(i) a moveable reference clock, and (ii) means which corrects times of the moveable reference clock by electrically connecting the moveable reference clock to the reference clock over a distance which is sufficiently short to avoid a delay time from becoming a problem.

5. The simulcast phase synchronization system as set forth in claim 1, wherein the means which temporarily stores signals comprises:

means which stores signals which have been sent from the central station after dividing the signals into frames.

* * * * *